(12) United States Patent
Sun et al.

(10) Patent No.: US 11,385,501 B2
(45) Date of Patent: Jul. 12, 2022

(54) BACKLIGHT MODULE, DISPLAY DEVICE, METHOD FOR DRIVING DISPLAY DEVICE, ELECTRONIC APPARATUS, AND COMPUTER-READABLE STORAGE MEDIUM

(71) Applicant: SHENZHEN PLANCK INNOVATION TECHNOLOGY CO., LTD, Guangdong (CN)

(72) Inventors: Xiaowei Sun, Guangdong (CN); Kai Wang, Guangdong (CN); Bing Xu, Guangdong (CN); Zuoliang Wen, Guangdong (CN)

(73) Assignee: SHENZHEN PLANCK INNOVATION TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/755,063

(22) PCT Filed: Apr. 16, 2019

(86) PCT No.: PCT/CN2019/082820
§ 371 (c)(1),
(2) Date: Jun. 7, 2021

(87) PCT Pub. No.: WO2020/164183
PCT Pub. Date: Aug. 20, 2020

(65) Prior Publication Data
US 2021/0311363 A1    Oct. 7, 2021

(30) Foreign Application Priority Data
Feb. 11, 2019   (CN) .......................... 201910109987.3

(51) Int. Cl.
*G02F 1/1335*    (2006.01)
*G02F 1/13357*    (2006.01)
(Continued)

(52) U.S. Cl.
CPC .. *G02F 1/133614* (2021.01); *G02F 1/133603* (2013.01); *G02F 1/133612* (2021.01);
(Continued)

(58) Field of Classification Search
CPC ........ G02F 1/133614; G02F 1/133612; G09G 3/3413; G09G 3/3426; G09G 3/3607;
(Continued)

(56) References Cited

U.S. PATENT DOCUMENTS 9,140,929 B2    9/2015 Bae et al.
11,150,509 B2 * 10/2021 Liu ................... G02F 1/133605

FOREIGN PATENT DOCUMENTS

CN    201107513 Y    8/2008
CN    104932142 A    9/2015
(Continued)

OTHER PUBLICATIONS

Int'l Search Report (PCT/CN2019/082820), dated Oct. 31, 2019.

*Primary Examiner* — Kenneth B Lee, Jr.
(74) *Attorney, Agent, or Firm* — Hunton Andrews Kurth LLP

(57) ABSTRACT

Provided are a backlight module, a display device, a method for driving a display device, an electronic apparatus, and a computer-readable storage medium. The backlight module includes: a base substrate; multiple light emitting modules disposed on a side of the base substrate, where each of the multiple light emitting modules includes a first light emitting region, a second light emitting region and a third first light emitting region; and a light exiting layer disposed on a side of the light emitting modules facing away from the base substrate. Vertical projections of the first light emitting region, the second light emitting region and the third light emitting region on the base substrate overlap with vertical projections of a first light exiting region, a second light
(Continued)

exiting region and a third light exiting region on the base substrate respectively. Each backlight driving module is connected to at least one light emitting module.

12 Claims, 8 Drawing Sheets

(51) Int. Cl.
*G09G 3/34* (2006.01)
*G09G 3/36* (2006.01)

(52) U.S. Cl.
CPC ......... *G09G 3/3413* (2013.01); *G09G 3/3426* (2013.01); *G09G 3/3607* (2013.01); *G09G 2320/0233* (2013.01); *G09G 2320/062* (2013.01); *G09G 2320/066* (2013.01); *G09G 2320/0686* (2013.01)

(58) Field of Classification Search
CPC ..... G09G 2320/0233; G09G 2320/062; G09G 2320/066; G09G 2320/0686
See application file for complete search history.

(56) References Cited

FOREIGN PATENT DOCUMENTS

| | | |
|---|---|---|
| CN | 105301836 A | 2/2016 |
| CN | 105761684 A | 7/2016 |
| CN | 107705759 A | 2/2018 |
| CN | 108983499 A | 12/2018 |
| CN | 108983799 A | 12/2018 |
| CN | 109031758 A | 12/2018 |

* cited by examiner

170

BACKLIGHT MODULE, DISPLAY DEVICE, METHOD FOR DRIVING DISPLAY DEVICE, ELECTRONIC APPARATUS, AND COMPUTER-READABLE STORAGE MEDIUM

This is a National Stage Application, filed under 35 U.S.C. 371, of International Patent Application No. PCT/CN2019/082820, filed on Apr. 16, 2019, which claims priority to Chinese patent application No. 201910109987.3 filed on Feb. 11, 2019, contents of both of which are incorporated herein by reference in their entireties.

TECHNICAL FIELD

The present disclosure relates to the field of liquid crystal display panels, for example, to a backlight module, a display device, a method for driving a display device, an electronic apparatus, and a computer-readable storage medium.

BACKGROUND

A traditional liquid crystal display device generally includes a liquid crystal display panel and a backlight module. According to a position of a backlight light source (such as a light emitting diode (LED) lamp bead), the backlight module may be divided into two structures: edge-lit backlight and direct-lit backlight. The edge-lit backlight generally uses the backlight light source, a light guide plate, a diffusion plate and the like to obtain emergent light. For the backlight of the direct-lit backlight module, a backlight light source array is usually directly arranged on a light exiting surface of the backlight module.

A Local Dimming (LD) technology is a technology for adjusting and controlling a local light exiting amount of the backlight light source to match an intensity of the backlight light source with the brightness of a currently-displayed picture. Exemplarily, when the brightness of a display picture is higher, the light exiting amount of the backlight light source may be appropriately increased to increase a backlight intensity; when the brightness of the display picture is lower, the light exiting amount of the backlight light source may be appropriately reduced to reduce the backlight intensity.

In the existing art, in order to obtain a better backlight effect, the LD technology is generally used to adjust the brightness of a local region of the direct-lit backlight module, so that the brightness of the local region of the backlight module can be adjusted in real time according to the brightness of the display picture, and a display picture with better contrast is obtained. Therefore, the light exiting amount of the backlight light source can be adjusted by use of the LD technology.

SUMMARY

The present disclosure provides a backlight module, a display device, a method for driving a display device, an electronic apparatus, and a computer-readable storage medium, which can implement the adjustments of brightness and a backlight color of the backlight module.

The present disclosure provides a backlight module. The backlight module includes a base substrate, multiple light emitting modules, a light exiting layer and multiple backlight driving modules.

The multiple light emitting modules are disposed on a side of the base substrate and in different regions of the backlight module, where each of the multiple light emitting modules includes a first light emitting region, a second light emitting region and a third light emitting region.

The light exiting layer is disposed on a side of the light emitting modules facing away from the base substrate, where the light exiting layer includes a first light exiting region, a second light exiting region and a third light exiting region.

An overlapping region exists between a vertical projection of the first light emitting region on the base substrate and a vertical projection of the first light exiting region on the base substrate, an overlapping region exists between a vertical projection of the second light emitting region on the base substrate and a vertical projection of the second light exiting region on the base substrate, and an overlapping region exists between a vertical projection of the third light emitting region on the base substrate and a vertical projection of the third light exiting region on the base substrate.

Each of the multiple backlight driving modules is connected to at least one of the multiple light emitting modules, and the multiple backlight driving modules is configured to drive the light emitting modules disposed in different regions of the backlight module to respectively control a light emitting intensity of the first light emitting region, a light emitting intensity of the second light emitting region and a light emitting intensity of the third light emitting region in each of the drove light emitting modules.

The present disclosure further provides a display device. The display device includes the backlight module described above and further includes a liquid crystal display panel.

The liquid crystal display panel is disposed on a side of the light exiting layer of the backlight module.

The liquid crystal display panel further includes a display driving module. The display driving module is configured to receive same image information as backlight driving modules.

The present disclosure further provides a method for driving a display device. The method is applied for driving the display device described above. The method includes steps described below.

The backlight driving modules and the display driving module are controlled to simultaneously acquire image information of a pre-displayed image, where the image information includes brightness information and color information of the pre-displayed image.

The backlight driving modules are controlled to control brightness of different regions of the backlight module according to the brightness information and adjust backlight colors of different regions of the backlight module according to the color information.

The display driving module is controlled to drive, according to the image information, the liquid crystal display panel to display an image.

The present disclosure further provides an electronic apparatus. The electronic apparatus includes at least one processor and a memory.

The memory is configured to store at least one program. The at least one program, when executed by the at least one processor, causes the at least one processor to implement the method described above.

The present disclosure further provides a computer-readable storage medium. The computer-readable storage medium stores computer-executable instructions. The computer-executable instructions are used for executing the method described above.

DETAILED DESCRIPTION

Figure 1:
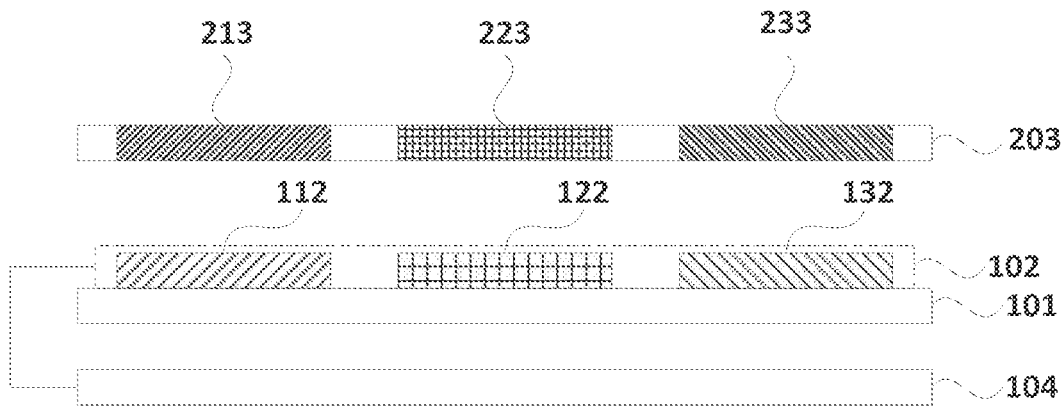
FIG. 1 is a structural diagram of a backlight module according to an embodiment of the present disclosure.

Because in an LD technology, a backlight light source generally uses a combination of a traditional blue light LED and yellow phosphor, merely a light exiting amount of the backlight light source can be adjusted. However, a ratio of red light, green light and blue light in a backlight spectrum is fixed no matter what the light exiting amount of the backlight light source is. Therefore, the backlight light source can merely provide white backlight.

The present disclosure provides a backlight module. The backlight module includes a base substrate, multiple light emitting modules, a light exiting layer and multiple backlight driving modules.

The multiple light emitting modules are disposed on a side of the base substrate and in different regions of the backlight module, where each of the multiple light emitting modules includes a first light emitting region, a second light emitting region and a third light emitting region.

The light exiting layer is disposed on a side of the light emitting modules facing away from the base substrate, where the light exiting layer includes a first light exiting region, a second light exiting region and a third light exiting region.

An overlapping region exists between a vertical projection of the first light emitting region on the base substrate and a vertical projection of the first light exiting region on the base substrate, an overlapping region exists between a vertical projection of the second light emitting region on the base substrate and a vertical projection of the second light exiting region on the base substrate, and an overlapping region exists between a vertical projection of the third light emitting region on the base substrate and a vertical projection of the third light exiting region on the base substrate.

Each of the multiple backlight driving modules is connected to at least one of the multiple light emitting modules, and the multiple backlight driving modules are configured to drive the light emitting modules disposed in different regions of the backlight module to respectively control a light emitting intensity of the first light emitting region, a light emitting intensity of the second light emitting region and a light emitting intensity of the third light emitting region in each of the drove light emitting modules.

In an embodiment, material of the first light exiting region includes at least one of: KSF phosphor, a quantum dot, perovskite phosphor, silicate phosphor, aluminate phosphor, nitride phosphor or Sialon phosphor.

Material of the second light exiting region includes at least one of: the quantum dot, the perovskite phosphor, the silicate phosphor, the aluminate phosphor, the nitride phosphor or the Sialon phosphor.

Material of the third light exiting region includes at least one of: the quantum dot, the perovskite phosphor, the silicate phosphor, the aluminate phosphor, the nitride phosphor or the Sialon phosphor.

In an embodiment, the light exiting layer is a quantum dot layer; the first light exiting region is a first quantum dot region, the second light exiting region is a second quantum dot region, and the third light exiting region is a third quantum dot region.

In an embodiment, the quantum dot layer includes a substrate layer and quantum dots coated on the substrate layer.

The quantum dots include red light quantum dots coated on the substrate layer in the first quantum dot region and green light quantum dots coated on the substrate layer in the second quantum dot region, or the quantum dots include red light quantum dots coated on the substrate layer in the first quantum dot region, green light quantum dots coated on the substrate layer in the second quantum dot region and blue light quantum dots coated on the substrate layer in the third quantum dot region.

The substrate layer is a transparent layer.

In an embodiment, each first light emitting region, each second light emitting region, and each third light emitting region include at least one blue light emitting diode.

The red light quantum dots are coated on the substrate layer in the first quantum dot region, the green light quantum dots are coated on the substrate layer in the second quantum dot region, and no quantum dot is coated on the substrate layer in the third quantum dot region.

In an embodiment, each first light emitting region, each second light emitting region, and each third light emitting region include at least one violet light emitting diode.

The red light quantum dots are coated on the substrate layer in the first quantum dot region, the green light quantum dots are coated on the substrate layer in the second quantum dot region, and the blue light quantum dots are coated on the substrate layer in the third quantum dot region.

In an embodiment, each first light emitting region, each second light emitting region, and each third light emitting region include at least one ultraviolet light emitting diode.

The red light quantum dots are coated on the substrate layer in the first quantum dot region, the green light quantum dots are coated on the substrate layer in the second quantum dot region, and the blue light quantum dots are coated on the substrate layer in the third quantum dot region.

In an embodiment, the first quantum dot region, the second quantum dot region and the third quantum dot region have a same shape and a same size.

In an embodiment, the quantum dot layer includes a plurality of first quantum dot regions, a plurality of second quantum dot regions, and a plurality of third quantum dot regions arranged in an array.

Along a row direction, the first quantum dot regions, the second quantum dot regions, and the third quantum dot regions are alternately arranged.

Along a column direction, the plurality of first quantum dot regions is arranged sequentially to form a first quantum dot region column, the plurality of second quantum dot regions is arranged sequentially to form a second quantum dot region column, and the plurality of third quantum dot regions is arranged sequentially to form a third quantum dot region column.

In an embodiment, the quantum dot layer includes a plurality of first quantum dot regions, a plurality of second quantum dot regions, and a plurality of third quantum dot regions arranged in a matrix.

The quantum dot layer includes an odd-row quantum dot region and an even-row quantum dot region.

The odd-row quantum dot region includes the first quantum dot regions, the third quantum dot regions and the second quantum dot regions alternately arranged in sequence.

The even-row quantum dot region includes the second quantum dot regions, the first quantum dot regions and the third quantum dot regions alternately arranged in sequence.

Along a row direction, the odd-row quantum dot region and the even-row quantum dot region adjacent to the odd-row quantum dot region are staggered by a preset distance.

In an embodiment, multiple odd-row quantum dot regions and multiple even-row quantum dot regions are disposed.

Along a column direction, the multiple odd-row quantum dot regions are aligned with each other, and the multiple even-row quantum dot regions are aligned with each other.

In an embodiment, the quantum dot layer includes multiple first quantum dot regions, multiple second quantum dot regions, and multiple third quantum dot regions arranged in a matrix.

Along a row direction, the second quantum dot regions, the third quantum dot regions and the first quantum dot regions are alternately arranged in sequence.

Along a column direction, the second quantum dot regions, the first quantum dot regions and the third quantum dot regions are alternately arranged in sequence.

In an embodiment, light emitted from the first light exiting region is red light, light emitted from the second light exiting region is green light, and light emitted from the third light exiting region is blue light.

FIG. 1 is a structural diagram of a backlight module according to an embodiment of the present disclosure. Referring to FIG. 1, the backlight module includes a base substrate 101, multiple light emitting modules 102, a light exiting layer 203 and multiple backlight driving modules 104. The multiple light emitting modules 102 are disposed on a side of the base substrate 101, where each of the multiple light emitting modules 102 includes a first light emitting region 112, a second light emitting region 122 and a third light emitting region 132. The light exiting layer 203 is disposed on a side of the light emitting modules 102 facing away from the base substrate 101, where the light exiting layer 203 includes a first light exiting region 213, a second light exiting region 223 and a third light exiting region 233. An overlapping region exists between a vertical projection of the first light emitting region 112 on the base substrate 101 and a vertical projection of the first light exiting region 213 on the base substrate 101, an overlapping region exists between a vertical projection of the second light emitting region 122 on the base substrate 101 and a vertical projection of the second light exiting region 223 on the base substrate 101, and an overlapping region exists between a vertical projection of the third light emitting region 132 on the base substrate 101 and a vertical projection of the third light exiting region 233 on the base substrate 101. Light emitted from the first light exiting region 213 is red light, light emitted from the second light exiting region 223 is green light, and light emitted from the third light exiting region 233 is blue light. Each of the multiple backlight driving modules 104 is connected to at least one of the multiple light emitting modules 102.

In some embodiments, after light emitted from the first light emitting region 112 passes through the first light exiting region 213, the red light may be emitted; after light emitted from the second light emitting region 122 passes through the second light exiting region 223, the green light may be emitted; and after light emitted from the third light emitting region 132 passes through the third light exiting region 233, the blue light may be emitted. By adjusting a combination of the red light, green light and blue light, backlight of a white color or any other color may be formed. In addition, an intensity of light emitted from the light exiting layer 203 is determined by a light emitting intensity of the first light emitting region 112, a light emitting intensity of the second light emitting region 122 and a light emitting intensity of the third light emitting region 132. The backlight driving module 104 is used for adjusting power of the first light emitting region 112, power of the second light emitting region 122 and power of the third light emitting region 132, so that intensities of light emitted from the first light emitting region 112, the second light emitting region 122 and the third light emitting region 132 may be controlled. Thereby, backlight with different brightness may be emitted from the light exiting layer 203, and the adjustment of brightness of the backlight is implemented. Therefore, the backlight module provided by the present embodiment may adjust not only the color of the backlight but also the overall or local brightness of the backlight.

It should be noted that in some embodiments, respective power of the first light emitting region 112, the second light emitting region 122, and the third light emitting region 132 in each light emitting module 102 may be respectively adjusted by the same backlight driving module 104.

The backlight module is commonly applied to a display device to provide backlight for image display. Thus, operation principles of the backlight module are explained by taking the backlight module applied to the display device as an example in the present embodiment. Since each backlight driving module 104 is connected to at least one of the multiple light emitting modules 102 and the multiple light emitting modules 102 are respectively disposed in different regions of the backlight module, different backlight driving modules 104 may drive the light emitting modules 102 disposed in different regions. The backlight driving module 104 is used for adjusting the light emitting intensities of the first light emitting region 112, the second light emitting region 122 and the third light emitting region 132 simultaneously according to a predetermined ratio, to adjust the brightness of white backlight. Exemplarily, when the overall or local brightness of an image displayed by the display device is lower, the backlight driving module 104 may be used for reducing the light emitting brightness of the light emitting module 102 corresponding to a region with the lower brightness in the image, and adjusting the brightness of the white backlight under the condition of ensuring the white backlight being provided, so that an intensity of the white backlight is adapted to the brightness of the image, and a backlight effect of the white light is improved. When the required brightness of backlight is lower, power consumption of the light emitting module 102 may be reduced by reducing the light emitting brightness of the light emitting module 102, so that electric energy is saved. Similarly, when the brightness of the image in the display device is higher, the light emitting brightness of the light emitting module 102 may also be increased to increase the brightness of the white backlight, which is not described in detail.

By reducing or increasing an intensity of any one of the red light, green light, and blue light, a color of light formed by mixing the red light, green light, and blue light may be controlled. Therefore, under the condition that the light emitting intensities of one part of the first light emitting region 112, the second light emitting region 122 and the third light emitting region 132 remain unchanged, backlight of any color can be obtained by reasonably reducing the light emitting brightness of the other part of the light emitting regions. In this process, since power of a light emitting region with an unchanged light emitting intensity is unchanged and power of a light emitting region with reduced light emitting brightness is reduced, the power consumption of the light emitting module 102 tends to be reduced while the backlight of any color is obtained, thereby saving the electric energy. Exemplarily, when the backlight module needs to provide green backlight, the backlight driving module 104 may appropriately reduce the light emitting brightness of the first light emitting region 112 and the third light emitting region 132 while keeping the light emitting intensity of the second light emitting region 122 unchanged. The light emitting intensity of the second light emitting region 122 is unchanged, so that an intensity of the green light emitted from the second light exiting region 223 is unchanged. However, the light emitting brightness of the first light emitting region 112 and the third light emitting region 132 are reduced, so that an intensity of the red light emitted from the first light exiting region 213 is reduced, and an intensity of the blue light emitted from the third light exiting region 233 is also reduced. Therefore, the red light, green light and blue light emitted from the light exiting layer 203 may form the green backlight after being mixed. Meanwhile, the power of the second light emitting region 122 is unchanged, and the power of the first light emitting region 112 and the third light emitting region 132 are reduced, so that the total power consumption of the light emitting module 102 is reduced. For another example, yellow light may be obtained by mixing the red light and the green light; and when the backlight module needs to provide yellow backlight, the backlight driving module 104 may reduce the light emitting intensity of the third light emitting region 132 while keeping the light emitting intensities of the first light emitting region 112 and the second light emitting region 122 unchanged, so that the yellow backlight is obtained by reducing output of the blue light. The power of the first light emitting region 112 and the second light emitting region 122 are unchanged, and the power of the third light emitting region 132 is reduced, so that the power consumption of the light emitting module 102 can also be reduced.

In addition, it should be noted that the backlight module provided in the present embodiment may also adjust the color of the backlight and the brightness of the backlight simultaneously. If the brightness of the backlight provided by the backlight module is required to be lower, the light emitting brightness of the first light emitting region 112, the second light emitting region 122, and the third light emitting region 132 may be reduced simultaneously according to a same degree, to obtain the white backlight with the lower brightness. Alternatively, the light emitting brightness of the first light emitting region 112, the second light emitting region 122, and the third light emitting region 132 may be reduced to different degrees, respectively, to obtain the backlight of any color. Taking the green backlight as an example, if a green color of the image is darker, the light emitting brightness of the second light emitting region 122 may also be appropriately reduced while the light emitting brightness of the first light emitting region 112 and the third light emitting region 132 are reduced. By reducing the light emitting brightness of the second light emitting region 122 to a lesser degree than the light emitting brightness of the first light emitting region 112 and the third light emitting region 132, the darker green backlight may be obtained. If the color of the image is brighter, the light emitting brightness of the second light emitting region 122 may be increased appropriately while the light emitting brightness of the first light emitting region 112 and the third light emitting region 132 are reduced, so that the green backlight with higher brightness is obtained. It should be understood that other colors of backlight may be adjusted by using similar principles, which are not listed one by one herein.

It should be noted that the backlight module is commonly applied to a liquid crystal display device to provide the backlight for the display device, the display device may display different pictures and the requirements of different pictures on backlight are different. For example, if a certain picture displayed by the display device is a green meadow, a region with a large area in the picture is a green region. In this case, the backlight module may be adjusted to provide the green backlight for the green region in the picture, so that the chroma of the picture may be increased.

In the backlight module provided by the present embodiment, the first light emitting region, the second light emitting region and the third light emitting region are configured in the light emitting module, and light emitted from the first light emitting region, light emitted from the second light emitting region and light emitted from the third light emitting region respectively passes through the first light exiting region, the second light exiting region and the third light exiting region in a quantum dot layer. Light emitting intensities of each first light emitting region, each second light emitting region and each third light emitting region are respectively controlled by the multiple backlight driving modules, so that the color and the brightness of the backlight emitted from the quantum dot layer can be adjusted, the backlight effect of the backlight module is improved and the power consumption of the backlight module is reduced.

In an embodiment, the material of the first light exiting region 213 includes at least one of: KSF phosphor, a quantum dot, perovskite phosphor, silicate phosphor, aluminate phosphor, nitride phosphor or Sialon phosphor. In an embodiment, the material of the second light exiting region 223 includes at least one of: the quantum dot, the perovskite phosphor, the silicate phosphor, the aluminate phosphor, the nitride phosphor or the Sialon phosphor. In an embodiment, the material of the second light exiting region 233 includes at least one of: the quantum dot, the perovskite phosphor, the silicate phosphor, the aluminate phosphor, the nitride phosphor or the Sialon phosphor.

The KSF red phosphor is short for a chemical formula $K_2SiF_6:Mn^{4+}$, which is commonly called potassium fluosilicate (containing tetravalent manganese ions) or fluoride phosphor, and is capable of emitting red light. Moreover, a half-peak width of a spectrum of the red light emitted by the KSF red phosphor is very narrow and energy of the red light emitted by the KSF red phosphor is very high. The KSF red phosphor is an excellent light converting material. A half-peak width of a light emitting peak of the quantum dot (such as a CdSe-based quantum dot or an InP-based quantum dot) is generally less than 30 nm, and the quantum dot is an excellent light converting material. Perovskite material is generally capable of adjusting an emission wavelength by adjusting and controlling components of halogen ions (such as I-, Br- and Cl-) and a half-peak width of the perovskite emission is around 20 nm. The perovskite material is also an excellent light converting material.

The half-peak widths of light emitting spectrums of the materials described above are relatively narrow, and the backlight module manufactured by using the material with narrow half-peak width improves contrast of the display device when being applied to the display device. However, it should be understood that when the light exiting layer 203 may also be made of common material with a relatively wide line-width, such as the silicate phosphor or the aluminate phosphor which has relatively low costs, more stable properties, and good economic benefits. In addition, only several types of wide-line-width phosphor materials and narrow-line-width phosphor materials are listed exemplarily, but it should be understood that the phosphor material of the light exiting layer 203 in the present embodiment may also be another type of material. In addition, it should be further noted that the light exiting layer 203 may be made of one of the materials described above, or the light exiting layer 203 may be made of a variety of materials selected from the materials described above in any combination form. When the condition that the red light, green light, and blue light may be formed is met, the present embodiment does not limit the selection of specific material of the light exiting layer 203.

In an embodiment, the light exiting layer 203 is the quantum dot layer. The first light exiting region 213 is a first quantum dot region, the second light exiting region 223 is a second quantum dot region, and the third light exiting region 233 is a third quantum dot region.

The half-peak width of the spectrum of the quantum dot is narrow and generally less than 30 nm. When light excited by the quantum dot is used as the backlight, a higher contrast backlight can be obtained. Exemplarily, still taking a green picture to be displayed as an example, when the display device where the backlight module is disposed displays a green image, the backlight module may provide the green backlight. The half-peak width of a spectrum of green light emitted by a green light quantum dot is narrow, and the green light has a relatively small amount of light of other components, so that green light with a better backlight effect is obtained and the contrast of the display device is improved.

However, it should be understood that, under the condition that the first light exiting region 213, the second light exiting region 223 and the third light exiting region 233 are capable of emitting the red light, the green light and the blue light, respectively, the backlight module provided by the present embodiment can reduce the power consumption of the backlight module. Therefore, when only the power consumption of the backlight module is considered to be reduced, the light exiting layer 203 may also be a phosphor layer or made of the perovskite material, which is not limited in the present embodiment.

Figure 2:
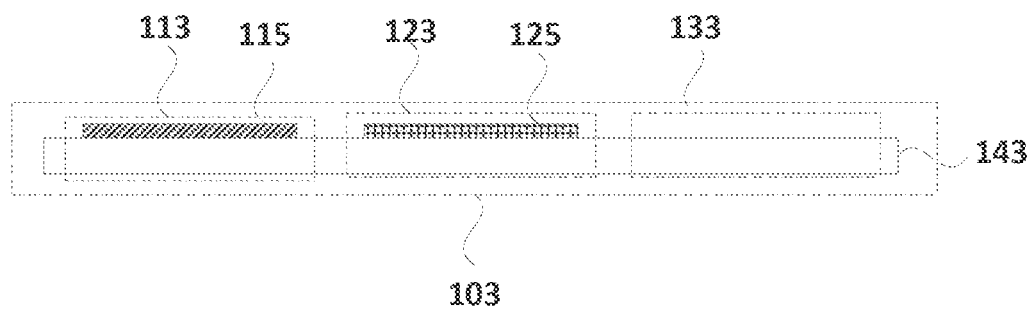
FIG. 2 is a structural diagram of a quantum dot layer according to an embodiment of the present disclosure.
Figure 3:
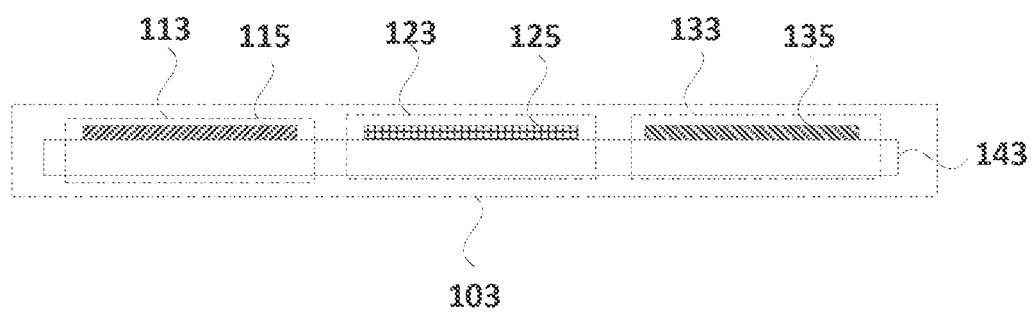
FIG. 3 is a structural diagram of another quantum dot layer according to an embodiment of the present disclosure.

FIG. 2 is a structural diagram of a quantum dot layer according to an embodiment of the present disclosure. FIG. 3 is a structural diagram of another quantum dot layer according to an embodiment of the present disclosure. Referring to FIG. 2 and FIG. 3, a quantum dot layer 103 includes a substrate layer 143 and quantum dots coated on the substrate layer 143. As shown in FIG. 2, the quantum dots include red light quantum dots 115 and green light quantum dots 125, or as shown in FIG. 3, the quantum dots include the red light quantum dots 115, the green light quantum dots 125, and blue light quantum dots 135. The substrate layer 143 is a transparent layer.

The quantum dots are disposed on a side of the substrate layer 143 facing away from the base substrate 101, and light from the light emitting module 102 may pass through the substrate layer 143 and reach the quantum dots, or light from the light emitting module 102 may be directly emitted after passing through the substrate layer 143. The red light quantum dots 115 may convert light (e.g., the blue light, violet light, or ultraviolet light) with a wavelength less than the red light into the red light, the green light quantum dots 125 may convert light (e.g., the blue light, the violet light, or the ultraviolet light) with a wavelength less than the green light into the green light, and the blue light quantum dots 135 may convert light (e.g., the violet light or the ultraviolet light) with a wavelength less than the blue light into the blue light. When the light emitted from the light emitting module 102 is the blue light, the blue light may be directly combined with the red light and the green light to form light of any color. In this case, the blue light quantum dots 135 may not be provided in the third quantum dot region 133. It should be understood that the quantum dots may also be disposed on a side of the substrate layer 143 facing toward the base substrate 101, which is not limited in the present embodiment.

Figure 4:
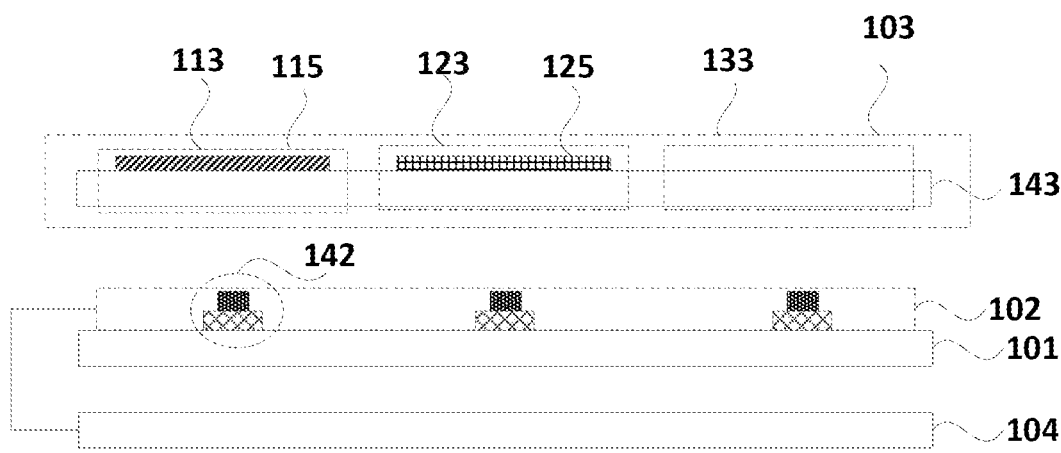
FIG. 4 is a structural diagram of another backlight module according to an embodiment of the present disclosure.

FIG. 4 is a structural diagram of another backlight module according to an embodiment of the present disclosure. Referring to FIG. 4, each first light emitting region 112, each second light emitting region 122, and each third light emitting region 132 include at least one blue light emitting diode 142, where the red light quantum dots 115 are coated on the substrate layer 143 in the first quantum dot region 113, the green light quantum dots 125 are coated on the substrate layer 143 in the second quantum dot region 123, and no quantum dot is coated on the substrate layer 143 in the third quantum dot region 133.

In the present embodiment, when light emitted by the light emitting module 102 is the blue light, the red light quantum dots 115 in the first quantum dot region 113 may exit the red light, the green light quantum dots 125 in the second quantum dot region 123 may exit the green light, and the blue light may be emitted from the third quantum dot region 133 without disposing the blue light quantum dots 135. Considering that a related manufacturing process of the blue light quantum dots 135 is not mature enough, the blue light emitting diode 142 is used as a light source of the light emitting module 102.

It should be noted that the light emitting module 102 is divided into the first light emitting region 112, the second light emitting region 122 and the third light emitting region 132 for the convenience of describing the structure of the backlight module provided in the present embodiment. However, it should be understood that the first light emitting region 112, the second light emitting region 122 and the third light emitting region 132 may have a same blue light emitting diode 142 or another type of light emitting diode.

It should be further noted that each first light emitting region 112, each second light emitting region 122, and each third light emitting region 132 in FIG. 4 include only one blue light emitting diode 142. However, it should be understood that in other embodiments, each first light emitting region 112, each second light emitting region 122, and each third light emitting region 132 may further include multiple blue light emitting diodes 142.

Figure 5:
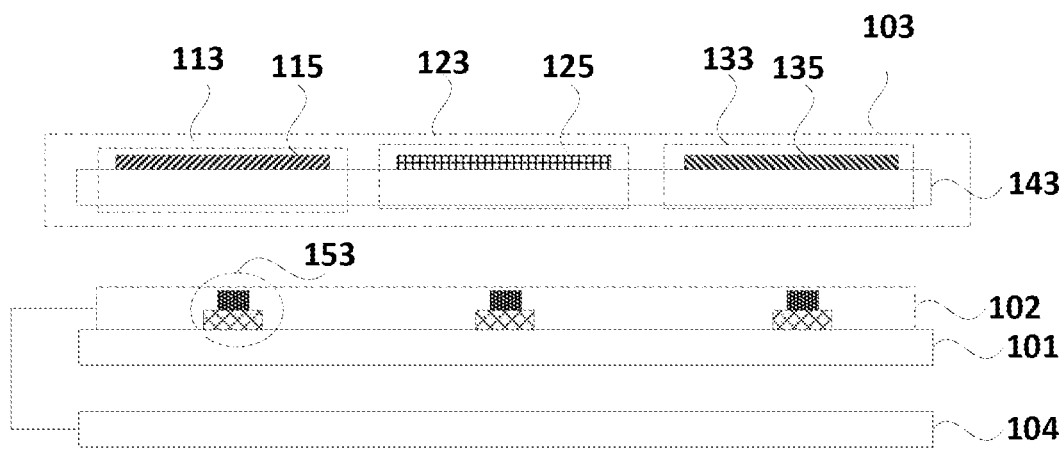
FIG. 5 is a structural diagram of another backlight module according to an embodiment of the present disclosure.

FIG. 5 is a structural diagram of another backlight module according to an embodiment of the present disclosure. Referring to FIG. 5, each first light emitting region 112, each second light emitting region 122, and each third light emitting region 132 include at least one violet light emitting diode 153, where the red light quantum dots 115 are coated on the substrate layer 143 in the first quantum dot region 113, the green light quantum dots 125 are coated on the substrate layer 143 in the second quantum dot region 123, and the blue light quantum dots 135 are coated on the substrate layer 143 in the third quantum dot region 133.

The violet light emitting diode 153 is used for emitting the violet light. Compared with the blue light, the violet light has higher energy and a higher efficiency of exciting the red light and the green light. Therefore, the violet light emitting diode 153 may also be used as the light source of the light emitting module 102. In this case, in order to obtain the blue light, the blue light quantum dots 135 need to be coated in the third quantum dot region 133.

In an embodiment, since the ultraviolet light has a shorter wavelength and a higher exciting efficiency than the violet light, the violet light emitting diode 153 in FIG. 5 may also be substituted with an ultraviolet light emitting diode under the condition that other structures of the backlight module in FIG. 5 are unchanged. In an embodiment, the structure of the backlight module with the ultraviolet light emitting diode is as follows: each first light emitting region 112, each second light emitting region 122 and each third light emitting region 132 include at least one ultraviolet light emitting diode, where the red light quantum dots 115 are coated on the substrate layer 143 in the first quantum dot region 113, the green light quantum dots 125 are coated on the substrate layer 143 in the second quantum dot region 123, and the blue light quantum dots 135 are coated on the substrate layer 143 in the third quantum dot region 133.

In summary, the backlight module provided by the present embodiment may use a light emitting diode within a range from the blue light to the ultraviolet light as the light source of the light emitting module. Moreover, each first light emitting region 112, each second light emitting region 122 and each third light emitting region 132 include only one light emitting diode or multiple light emitting diodes. In an embodiment, considering that the ultraviolet light has the higher energy when its wavelength is too short, a light emitting wavelength of the ultraviolet light emitting diode may be greater than or equal to 350 nm and less than or equal to 400 nm (where 400 nm is used as a boundary between the violet light and the ultraviolet light) in order to prevent damages to the human body caused by ultraviolet light leakage.

In an embodiment, the first quantum dot region 113, the second quantum dot region 123 and the third quantum dot region 133 have a same shape and a same size. When the quantum dot layer 103 is formed, a mask plate tends to be used for forming the first quantum dot region 113, the second quantum dot region 123 and the third quantum dot region 133 on the substrate layer 143, so that difficulties in designing and manufacturing the mask plate may be reduced through this structure. It should be noted that this is only a feasible embodiment, and in other embodiments, shapes and/or sizes of the first quantum dot region 113, the second quantum dot region 123, and the third quantum dot region 133 may be arbitrarily set as needed.

Figure 6:
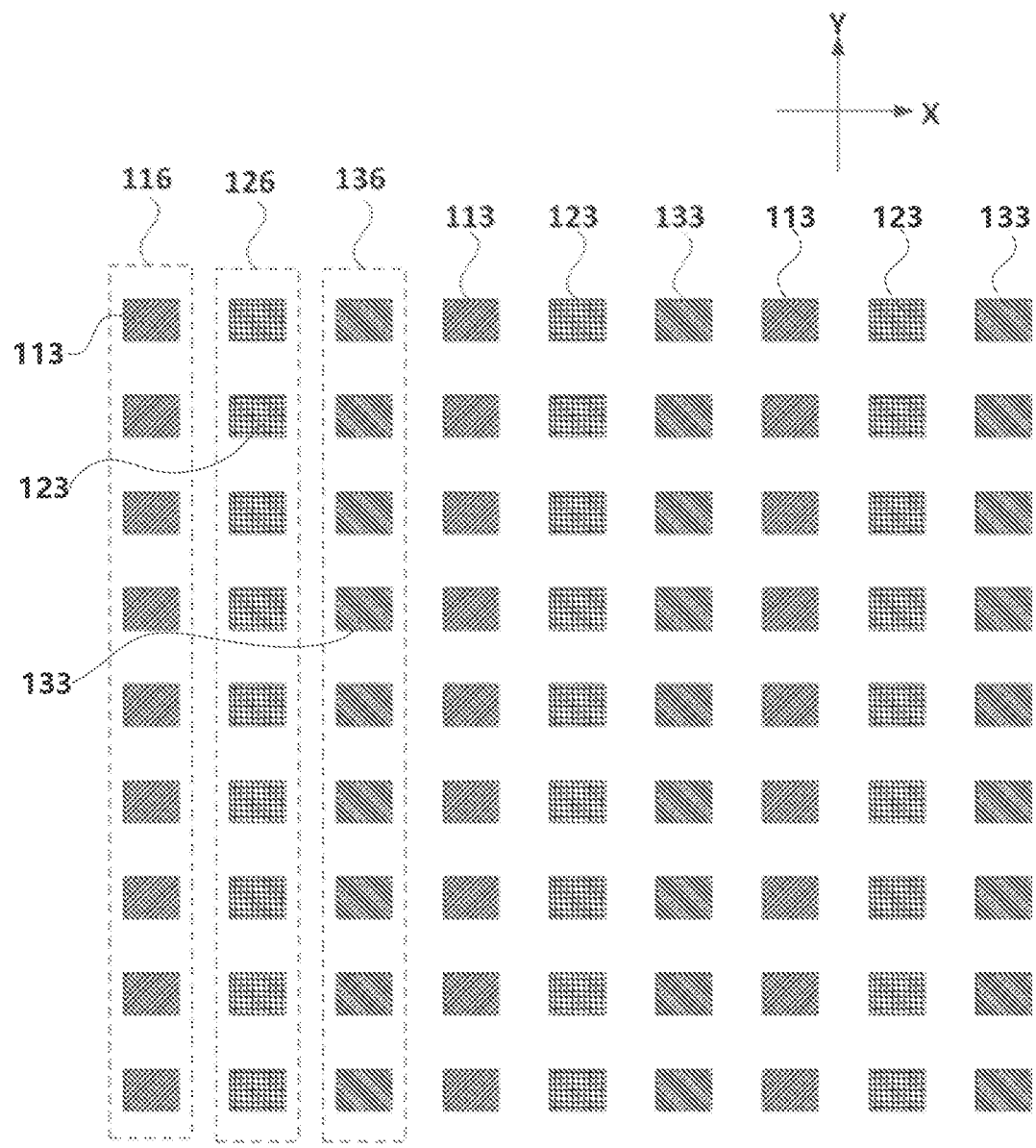
FIG. 6 is a schematic diagram of an arrangement of quantum dot regions according to an embodiment of the present disclosure.

FIG. 6 is a schematic diagram of an arrangement of quantum dot regions according to an embodiment of the present disclosure. Referring to FIG. 6, the quantum dot layer 103 provided by the present embodiment includes multiple first quantum dot regions 113, multiple second quantum dot regions 123, and multiple third quantum dot regions 133 arranged in an array. Along a row direction X, the first quantum dot regions 113, the second quantum dot regions 123, and the third quantum dot regions 133 are alternately arranged. Along a column direction Y, the multiple first quantum dot regions 113 are arranged sequentially to form first quantum dot region columns 116, the multiple second quantum dot regions 123 are arranged sequentially to form second quantum dot region columns 126, and the multiple third quantum dot regions 133 are arranged sequentially to form third quantum dot region columns 136.

Figure 7:
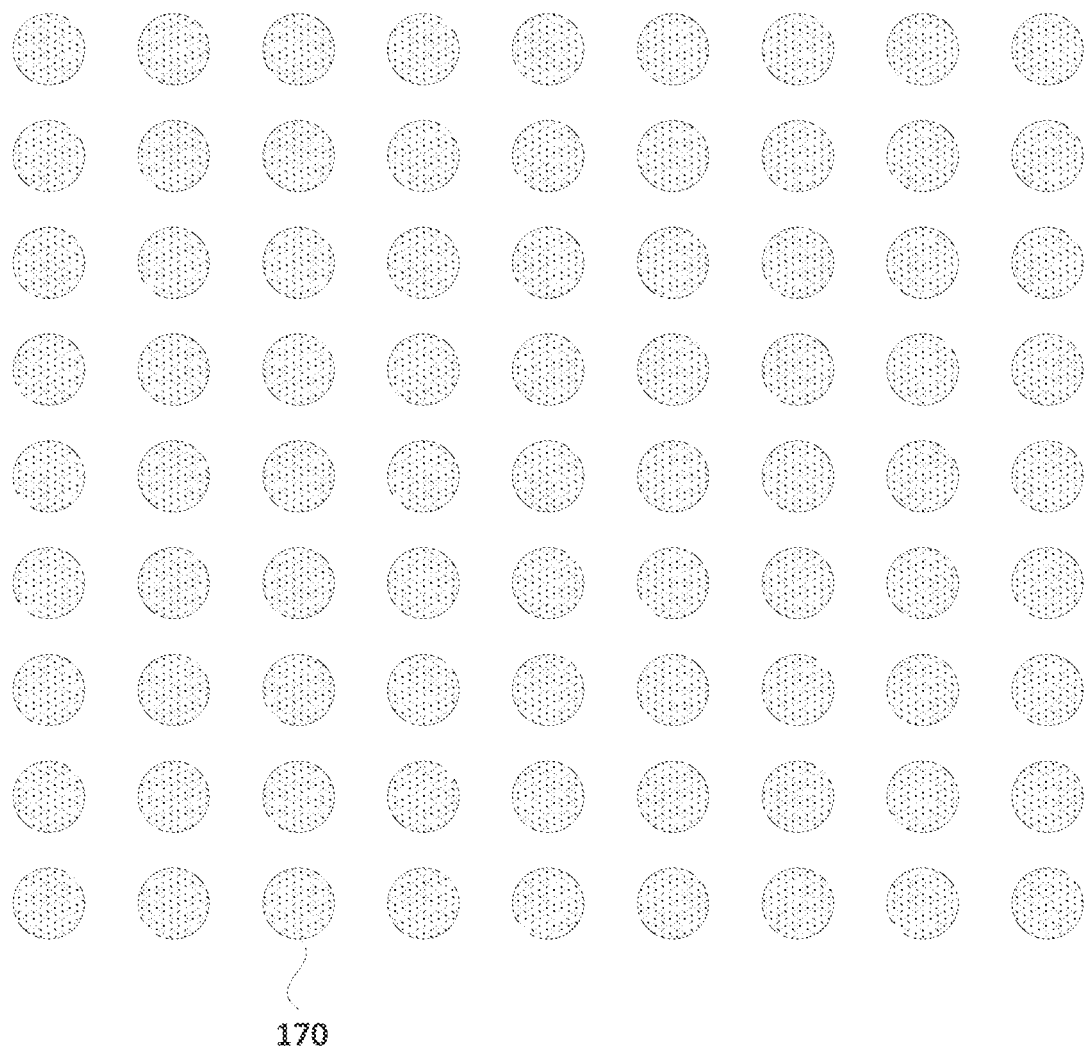
FIG. 7 is a structural diagram of light emitting diodes corresponding to the quantum dot regions in FIG. 6.

FIG. 7 is a structural diagram of light emitting diodes corresponding to the quantum dot regions in FIG. 6. Referring to FIG. 6 and FIG. 7, the arrangement of light emitting diodes 170 in FIG. 7 is the same as the arrangement of the quantum dot regions in FIG. 6, which can ensure that a vertical projection of the first quantum dot region 113 on the base substrate 101 at least overlaps with a vertical projection of one light emitting diode 170 on the base substrate 101, a vertical projection of the second quantum dot region 123 on the base substrate 101 at least overlaps with a vertical projection of one light emitting diode 170 on the base substrate 101, and a vertical projection of the third quantum dot region 133 on the base substrate 101 at least overlaps with a vertical projection of one light emitting diode 170 on the base substrate 101. In addition, the light emitting diode 170 may be the blue light emitting diode 142, the violet light emitting diode 153, the ultraviolet light emitting diode, or the like.

Figure 8:
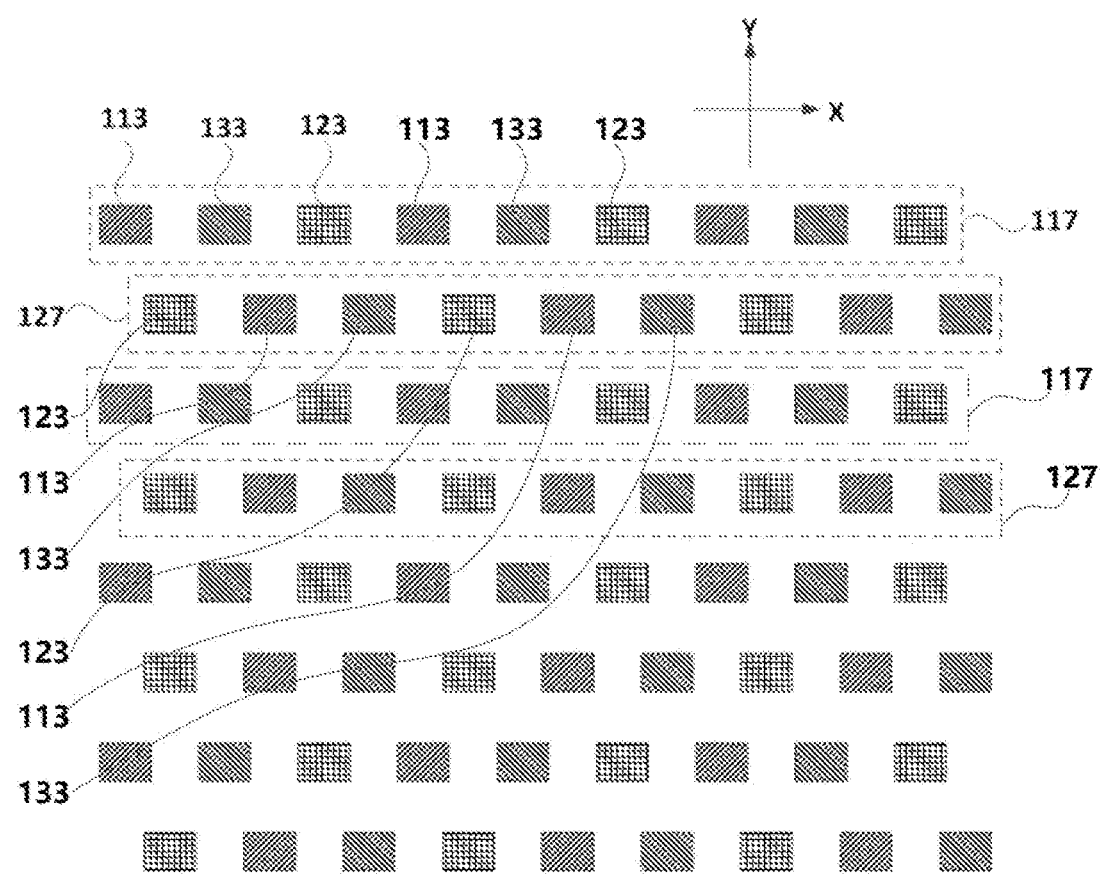
FIG. 8 is a schematic diagram of another arrangement of quantum dot regions according to an embodiment of the present disclosure.

FIG. 8 is a schematic diagram of another arrangement of quantum dot regions according to an embodiment of the present disclosure. Referring to FIG. 8, the quantum dot layer 103 provided by the present embodiment includes multiple first quantum dot regions 113, multiple second quantum dot regions 123, and multiple third quantum dot regions 133 arranged in a matrix. The quantum dot layer 103 includes odd-row quantum dot regions 117 and even-row quantum dot regions 127. Each odd-row quantum dot region 117 includes the first quantum dot regions 113, the third quantum dot regions 133 and the second quantum dot regions 123 alternately arranged in sequence. Each even-row quantum dot region 127 includes the second quantum dot regions 123, the first quantum dot regions 113, and the third quantum dot regions 133 alternately arranged in sequence. Along the column direction Y, the odd-row quantum dot regions 117 are aligned with each other, and the even-row quantum dot regions 127 are aligned with each other. Along the row direction X, the odd-row quantum dot region 117 and the even-row quantum dot region 127 adjacent to the odd-row quantum dot region are staggered by a preset distance.

It should be noted that along the row direction X, if the length of the first quantum dot region 113 is set to L, the preset distance may be ½L.

Figure 9:
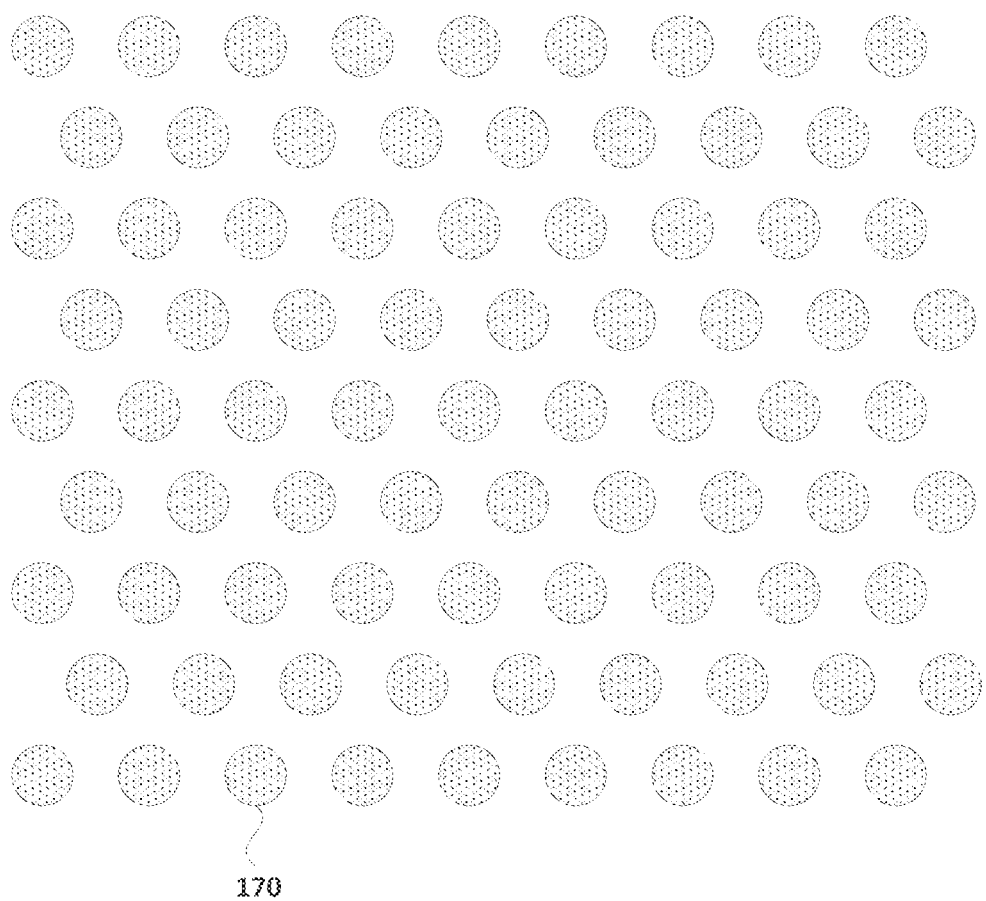
FIG. 9 is a structural diagram of light emitting diodes corresponding to the quantum dot regions in FIG. 8.

FIG. 9 is a structural diagram of light emitting diodes corresponding to the quantum dot regions in FIG. 8. Referring to FIG. 8 and FIG. 9, the arrangement of the light emitting diodes 170 in FIG. 9 is the same as the arrangement of the quantum dot regions in FIG. 8, which can ensure that the vertical projection of the first quantum dot region 113 on the base substrate 101 at least overlaps with the vertical projection of one light emitting diode 170 on the base substrate 101, the vertical projection of the second quantum dot region 123 on the base substrate 101 at least overlaps with the vertical projection of one light emitting diode 170 on the base substrate 101, and the vertical projection of the third quantum dot region 133 on the base substrate 101 at least overlaps with the vertical projection of one light emitting diode 170 on the base substrate 101.

Figure 10:
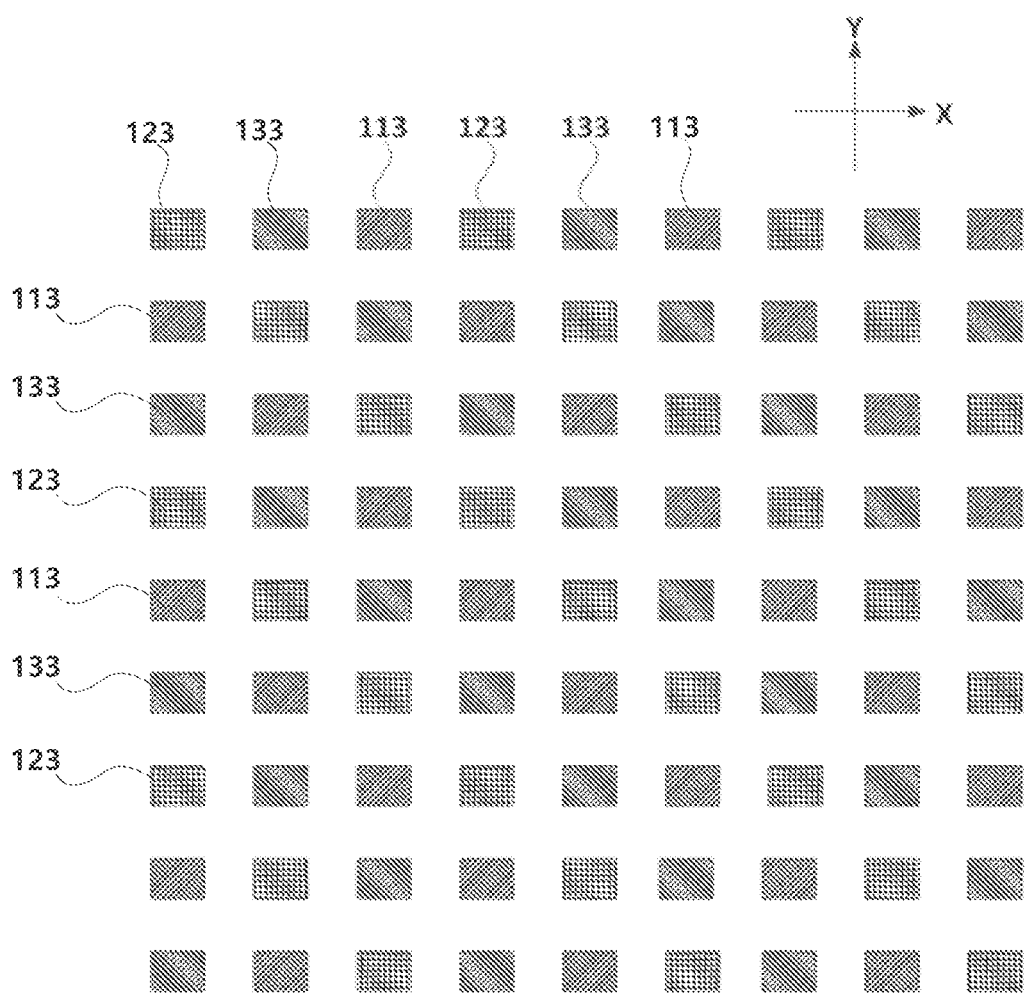
FIG. 10 is a schematic diagram of another arrangement of quantum dot regions according to an embodiment of the present disclosure.

FIG. 10 is a schematic diagram of another arrangement of quantum dot regions according to an embodiment of the present disclosure. Referring to FIG. 10, the quantum dot layer 103 provided by the present embodiment includes multiple first quantum dot regions 113, multiple second quantum dot regions 123, and multiple third quantum dot regions 133 arranged in the matrix. Along the row direction X, the second quantum dot regions 123, the third quantum dot regions 133, and the first quantum dot regions 113 are alternately arranged in sequence. Along the column direction Y, the second quantum dot regions 123, the first quantum dot regions 113, and the third quantum dot regions 133 are alternately arranged in sequence.

In an embodiment, the multiple first quantum dot regions 113, the multiple second quantum dot regions 123, and the multiple third quantum dot regions 133 in FIG. 10 and FIG. 6 are all aligned with each other, so that the arrangement of the light emitting diodes in FIG. 7 may be adopted for the light emitting diodes in FIG. 10.

The above only exemplarily describes three possible arrangements of the first quantum dot regions 113, the second quantum dot regions 123 and the third quantum dot regions 133, but which are not to limit the arrangement of the first quantum dot regions 113, the second quantum dot regions 123 and the third quantum dot regions 133 in the quantum dot layer 103 provided by the present embodiment.

It should be noted that although the present embodiment describes the principles and the structures of the backlight module by taking the quantum dots as an example, it should be understood that this is only one feasible embodiment. In practical applications, other types of materials may be adopted for the first light exiting region 213, the second light exiting region 223, and the third light exiting 233, for example, the KSF red phosphor, the perovskite material, or a combination of the multiple materials described below, which is not limited in the present embodiment.

Figure 11:
FIG. 11 is a structural diagram of a display device according to an embodiment of the present disclosure.

FIG. 11 is a structural diagram of a display device according to an embodiment of the present disclosure. Referring to FIG. 11, the display device provided by the present embodiment includes a backlight module 201 and further includes a liquid crystal display panel 202. The liquid crystal display panel 202 is disposed on a side of a light exiting layer 203 of the backlight module 201. The liquid crystal display panel 202 includes a display driving module. The display driving module is configured to receive same image information as backlight driving modules 104.

The display driving module is configured to drive the liquid crystal display panel 202 to display an image, and the backlight driving modules 104 are configured to drive light emitting modules 102 in the backlight module 201 to emit light. After the display driving module and the backlight driving modules 104 simultaneously receive image information to be displayed, the display driving module may drive the liquid crystal display panel 202 to display an image according to the image information. Meanwhile, the backlight driving modules 104 may drive the backlight module 201 to provide backlight matched with brightness and a color of the image, so that definition and contrast of the display device are improved. Therefore, a display effect is improved, and power consumption of the display device is reduced.

In an embodiment, the display device may be a television, a computer, a mobile phone, a tablet, or the like.

Figure 12:
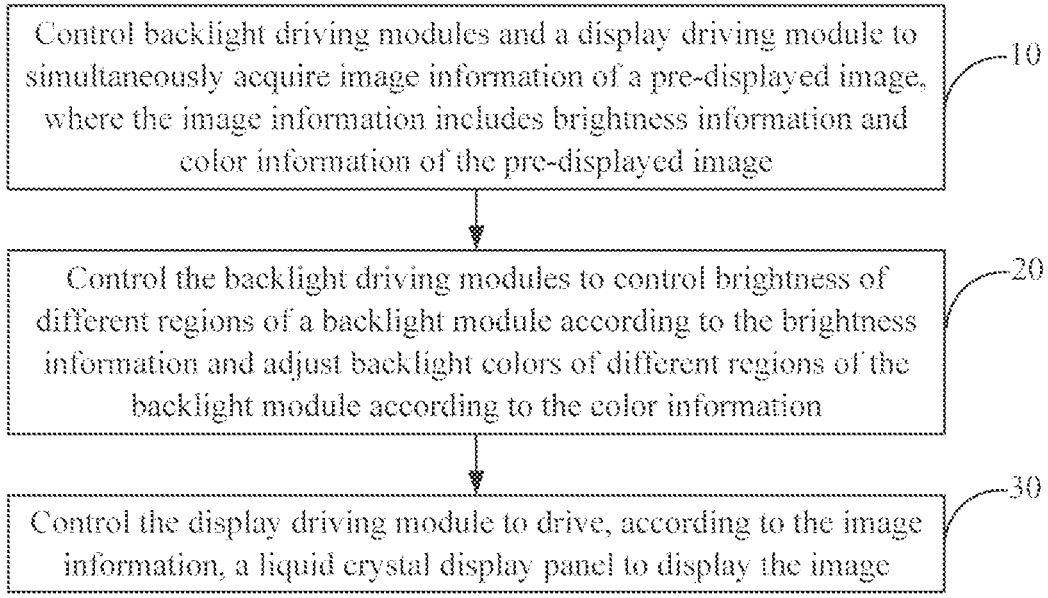
FIG. 12 is a flowchart of a method for driving a display device according to an embodiment of the present disclosure.

FIG. 12 is a flowchart of a method for driving a display device according to an embodiment of the present disclosure. Referring to FIG. 12, the method includes steps described below.

In a step 10, backlight driving modules and a display driving module are controlled to simultaneously acquire image information of a pre-displayed image, where the image information includes brightness information and color information of the pre-displayed image.

In an embodiment, when the display device is a computer, the computer may simultaneously send stored image information to the backlight driving modules and the display driving module. The image information may be position coordinates of multiple pixel points, and a gray scale value of red light, a gray scale value of green light, and a gray scale value of blue light corresponding to each pixel point. According to the gray scale values of each pixel point, the brightness information and the color information of the pre-displayed image may be determined. Before the image is displayed, the image information is provided for the backlight driving modules and the display driving module simultaneously, which can ensure that the backlight driving modules and the display driving module operate synchronously.

In a step 20, the backlight driving modules are controlled to control brightness of different regions of a backlight module according to the brightness information and adjust backlight colors of different regions of the backlight module according to the color information.

In an embodiment, according to the brightness information and the color information of the image, a backlight intensity and a backlight color of each region of the backlight module may be determined.

In a step 30, the display driving module is controlled to drive, according to the image information, a liquid crystal display panel to display the image.

It should be understood that the step 20 and the step 30 in the present embodiment are performed simultaneously, and are named as "step 20" and "step 30" respective only for convenience of description, which does not mean that the step 20 precedes the step 30. The display driving module may drive the liquid crystal display panel to operate in any existing driving manner or a driving manner provided in the future, which is not limited herein.

According to the method for driving the display device provided by the present embodiment, the image information is provided simultaneously for the display driving module and the backlight driving module, which can ensure that the backlight driving module drives the backlight module to provide the backlight while the liquid crystal display panel displays the image, and the brightness and the color of the backlight match with the image displayed by the liquid crystal display panel. Therefore, definition and contrast of the display device can be improved, and a display effect is improved.

Figure 13:
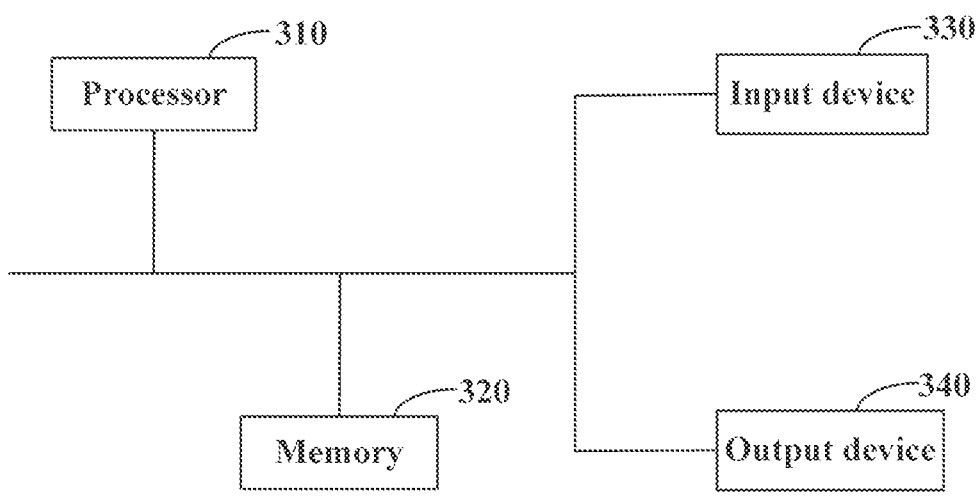
FIG. 13 is a structural diagram of an electronic apparatus according to an embodiment of the present disclosure.

FIG. 13 is a structural diagram of hardware of an electronic apparatus according to an embodiment. As shown in FIG. 13, the electronic apparatus includes: at least one processor 310 and a memory 320. One processor 310 is shown as an example in FIG. 13.

The electronic apparatus may further include an input device 330 and an output device 340.

The processor 310, the memory 320, the input device 330 and the output device 340 in the electronic apparatus may be connected via a bus or in other manners, and a connection via a bus is shown as an example in FIG. 13.

As a computer-readable storage medium, the memory 320 may be configured to store software programs and computer-executable programs and modules. The processor 310 executes the software programs, instructions and modules stored in the memory 320 to perform various function applications and data processing, to implement any one method in the embodiments described above.

The memory 320 may include a program storage region and a data storage region. The program storage region may store application programs required by an operating system and at least one function, and the data storage region may store data created according to use of the electronic apparatus. In addition, the memory 320 may include a volatile memory, such as a random access memory (RAM), and may also include a nonvolatile memory, such as at least one disk memory, a flash memory or other non-transient solid-state memories.

The memory 320 may be a non-transient computer storage medium or a transient computer storage medium. The non-transient computer storage medium includes, for example, at least one disk memory, a flash memory or other nonvolatile solid-state memories. In some embodiments, the memory 320 optionally includes memories remotely disposed relative to the processor 310 and these remote memories may be connected to the electronic apparatus via a network. Examples of the above network may include the Internet, an intranet, a local area network, a mobile communication network, and combinations thereof.

The input device 330 may be configured to receive inputted digital or character information, and generate key signal inputs related to user settings and function control of the electronic apparatus. The output device 340 may include a display device such as a display screen.

The present embodiment further provides a computer-readable storage medium, storing computer-executable instructions. The computer-executable instructions are used for executing the method described above.

All or part of the procedures in the methods in the above-mentioned embodiments may be implemented by executing related hardware through computer programs. The computer programs may be stored in a non-transient computer-readable storage medium. During the execution of the computer programs, the procedures in the methods in the above-mentioned embodiments may be included. The non-transient computer-readable storage medium may be a magnetic disk, an optical disk, a read-only memory (ROM), a RAM, or the like.

What is claimed is:

1. A backlight module, comprising:
   a base substrate;
   a plurality of light emitting modules, disposed on a side of the base substrate and in different regions of the backlight module, wherein each of the plurality of light emitting modules comprises a first light emitting region, a second light emitting region and a third light emitting region;
   a light exiting layer, disposed on a side of the light emitting modules facing away from the base substrate, wherein the light exiting layer comprises a first light exiting region, a second light exiting region and a third light exiting region; wherein an overlapping region exists between a vertical projection of the first light emitting region on the base substrate and a vertical projection of the first light exiting region on the base substrate, an overlapping region exists between a vertical projection of the second light emitting region on the base substrate and a vertical projection of the second light exiting region on the base substrate, and an overlapping region exists between a vertical projection of the third light emitting region on the base substrate and a vertical projection of the third light exiting region on the base substrate; and
   a plurality of backlight driving modules, wherein each of the plurality of backlight driving modules is connected to at least one of the plurality of light emitting modules, and the plurality of backlight driving modules is configured to drive the light emitting modules disposed in different regions of the backlight module to respectively control a light emitting intensity of the first light emitting region, a light emitting intensity of the second light emitting region and a light emitting intensity of the third light emitting region in each of the drive light emitting modules;
   wherein the light exiting layer is a quantum dot layer; and the first light exiting region is a first quantum dot region, the second light exiting region is a second quantum dot region, and the third light exiting region is a third quantum dot region;
   wherein the quantum dot layer comprises a substrate layer and quantum dots coated on the substrate layer; wherein the quantum dots comprise red light quantum dots coated on the substrate layer in the first quantum dot region and green light quantum dots coated on the substrate layer in the second quantum dot region, or the quantum dots comprise red light quantum dots coated on the substrate layer in the first quantum dot region, green light quantum dots coated on the substrate layer in the second quantum dot region and blue light quantum dots coated on the substrate layer in the third quantum dot region; and wherein the substrate layer is a transparent layer.

2. The backlight module of claim 1, wherein material of the first light exiting region comprises at least one of: KSF phosphor, a quantum dot, perovskite phosphor, silicate phosphor, aluminate phosphor, nitride phosphor or Sialon phosphor;
   material of the second light exiting region comprises at least one of: the quantum dot, the perovskite phosphor, the silicate phosphor, the aluminate phosphor, the nitride phosphor or the Sialon phosphor; and
   material of the third light exiting region comprises at least one of: the quantum dot, the perovskite phosphor, the silicate phosphor, the aluminate phosphor, the nitride phosphor or the Sialon phosphor.

3. The backlight module of claim 1, wherein each first light emitting region, each second light emitting region, and each third light emitting region comprise at least one blue light emitting diode; and
   the red light quantum dots are coated on the substrate layer in the first quantum dot region, the green light quantum dots are coated on the substrate layer in the second quantum dot region, and no quantum dot is coated on the substrate layer in the third quantum dot region.

4. The backlight module of claim 1, wherein each first light emitting region, each second light emitting region, and each third light emitting region comprise at least one violet light emitting diode; and
   the red light quantum dots are coated on the substrate layer in the first quantum dot region, the green light quantum dots are coated on the substrate layer in the second quantum dot region, and the blue light quantum dots are coated on the substrate layer in the third quantum dot region.

5. The backlight module of claim 1, wherein each first light emitting region, each second light emitting region, and each third light emitting region comprise at least one ultraviolet light emitting diode; and
the red light quantum dots are coated on the substrate layer in the first quantum dot region, the green light quantum dots are coated on the substrate layer in the second quantum dot region, and the blue light quantum dots are coated on the substrate layer in the third quantum dot region.

6. The backlight module of claim 1, wherein the first quantum dot region, the second quantum dot region and the third quantum dot region have a same shape and a same size.

7. A backlight module, comprising a base substrate, a plurality of light emitting modules, a light exiting layer and a plurality of backlight driving modules;
wherein the plurality of light emitting modules are disposed on a side of the base substrate and in different regions of the backlight module, wherein each of the plurality of light emitting modules comprises a first light emitting region, a second light emitting region and a third light emitting region;
wherein the light exiting layer is disposed on a side of the light emitting modules facing away from the base substrate, wherein the light exiting layer comprises a first light exiting region, a second light exiting region and a third light exiting region; wherein an overlapping region exists between a vertical projection of the first light emitting region on the base substrate and a vertical projection of the first light exiting region on the base substrate, an overlapping region exists between a vertical projection of the second light emitting region on the base substrate and a vertical projection of the second light exiting region on the base substrate, and an overlapping region exists between a vertical projection of the third light emitting region on the base substrate and a vertical projection of the third light exiting region on the base substrate;
wherein each of the plurality of backlight driving modules is connected to at least one of the plurality of light emitting modules, and the plurality of backlight driving modules is configured to drive the light emitting modules disposed in different regions of the backlight module to respectively control a light emitting intensity of the first light emitting region, a light emitting intensity of the second light emitting region and a light emitting intensity of the third light emitting region in each of the drove light emitting modules;
wherein the light exiting layer is a quantum dot layer; and the first light exiting region is a first quantum dot region, the second light exiting region is a second quantum dot region, and the third light exiting region is a third quantum dot region;
wherein the first quantum dot region, the second quantum dot region and the third quantum dot region have a same shape and a same size; and
wherein the quantum dot layer is provided as one of followings:
wherein the quantum dot layer comprises a plurality of first quantum dot regions, a plurality of second quantum dot regions, and a plurality of third quantum dot regions arranged in an array; along a row direction, the first quantum dot regions, the second quantum dot regions, and the third quantum dot regions are alternately arranged; and along a column direction, the plurality of first quantum dot regions is arranged sequentially to form a first quantum dot region column, the plurality of second quantum dot regions is arranged sequentially to form a second quantum dot region column, and the plurality of third quantum dot regions is arranged sequentially to form a third quantum dot region column; or
wherein the quantum dot layer comprises a plurality of first quantum dot regions, a plurality of second quantum dot regions, and a plurality of third quantum dot regions arranged in a matrix; the quantum dot layer comprises an odd-row quantum dot region and an even-row quantum dot region; the odd-row quantum dot region comprises the first quantum dot regions, the third quantum dot regions and the second quantum dot regions alternately arranged in sequence; the even-row quantum dot region comprises the second quantum dot regions, the first quantum dot regions and the third quantum dot regions alternately arranged in sequence; and along a row direction, the odd-row quantum dot region and the even-row quantum dot region adjacent to the odd-row quantum dot region are staggered by a preset distance; or
wherein the quantum dot layer comprises a plurality of first quantum dot regions, a plurality of second quantum dot regions, and a plurality of third quantum dot regions arranged in a matrix; along a row direction, the second quantum dot regions, the third quantum dot regions and the first quantum dot regions are alternately arranged in sequence; and along a column direction, the second quantum dot regions, the first quantum dot regions and the third quantum dot regions are alternately arranged in sequence.

8. The backlight module of claim 7, wherein the quantum dot layer comprises a plurality of first quantum dot regions, a plurality of second quantum dot regions, and a plurality of third quantum dot regions arranged in a matrix; the quantum dot layer comprises an odd-row quantum dot region and an even-row quantum dot region; the odd-row quantum dot region comprises the first quantum dot regions, the third quantum dot regions and the second quantum dot regions alternately arranged in sequence; the even-row quantum dot region comprises the second quantum dot regions, the first quantum dot regions and the third quantum dot regions alternately arranged in sequence; and along a row direction, the odd-row quantum dot region and the even-row quantum dot region adjacent to the odd-row quantum dot region are staggered by a preset distance;
wherein a plurality of odd-row quantum dot regions and a plurality of even-row quantum dot regions are disposed; and wherein along a column direction, the plurality of odd-row quantum dot regions is aligned with each other, and the plurality of even-row quantum dot regions is aligned with each other.

9. A display device, comprising a backlight module and a liquid crystal display panel;
wherein the backlight module comprises a base substrate, a plurality of light emitting modules, a light exiting layer and a plurality of backlight driving modules;
wherein the plurality of light emitting modules are disposed on a side of the base substrate and in different regions of the backlight module, wherein each of the plurality of light emitting modules comprises a first light emitting region, a second light emitting region and a third light emitting region;
wherein the light exiting layer is disposed on a side of the light emitting modules facing away from the base substrate, wherein the light exiting layer comprises a first light exiting region, a second light exiting region and a third light exiting region; wherein an overlapping region exists between a vertical projection of the first light emitting region on the base substrate and a vertical projection of the first light exiting region on the base substrate, an overlapping region exists between a vertical projection of the second light emitting region on the base substrate and a vertical projection of the second light exiting region on the base substrate, and an overlapping region exists between a vertical projection of the third light emitting region on the base substrate and a vertical projection of the third light exiting region on the base substrate;

wherein each of the plurality of backlight driving modules is connected to at least one of the plurality of light emitting modules, and the plurality of backlight driving modules is configured to drive the light emitting modules disposed in different regions of the backlight module to respectively control a light emitting intensity of the first light emitting region, a light emitting intensity of the second light emitting region and a light emitting intensity of the third light emitting region in each of the drove light emitting modules;

wherein the light exiting layer is a quantum dot layer; and the first light exiting region is a first quantum dot region, the second light exiting region is a second quantum dot region, and the third light exiting region is a third quantum dot region;

wherein the first quantum dot region, the second quantum dot region and the third quantum dot region have a same shape and a same size;

wherein the liquid crystal display panel is disposed on a side of the light exiting layer of the backlight module;

the liquid crystal display panel further comprises a display driving module, wherein the display driving module is configured to receive same image information as backlight driving modules;

wherein the quantum dot layer is provided as one of followings:

wherein the quantum dot layer comprises a plurality of first quantum dot regions, a plurality of second quantum dot regions, and a plurality of third quantum dot regions arranged in an array; along a row direction, the first quantum dot regions, the second quantum dot regions, and the third quantum dot regions are alternately arranged; and along a column direction, the plurality of first quantum dot regions is arranged sequentially to form a first quantum dot region column, the plurality of second quantum dot regions is arranged sequentially to form a second quantum dot region column, and the plurality of third quantum dot regions is arranged sequentially to form a third quantum dot region column; or wherein the quantum dot layer comprises a plurality of first quantum dot regions, a plurality of second quantum dot regions, and a plurality of third quantum dot regions arranged in a matrix; the quantum dot layer comprises an odd-row quantum dot region and an even-row quantum dot region; the odd-row quantum dot region comprises the first quantum dot regions, the third quantum dot regions and the second quantum dot regions alternately arranged in sequence; the even-row quantum dot region comprises the second quantum dot regions, the first quantum dot regions and the third quantum dot regions alternately arranged in sequence; and along a row direction, the odd-row quantum dot region and the even-row quantum dot region adjacent to the odd-row quantum dot region are staggered by a preset distance; or wherein the quantum dot layer comprises a plurality of first quantum dot regions, a plurality of second quantum dot regions, and a plurality of third quantum dot regions arranged in a matrix; along a row direction, the second quantum dot regions, the third quantum dot regions and the first quantum dot regions are alternately arranged in sequence; and along a column direction, the second quantum dot regions, the first quantum dot regions and the third quantum dot regions are alternately arranged in sequence.

10. A method for driving a display device, wherein the display device comprises a backlight module and a liquid crystal display panel;

wherein the backlight module comprises a base substrate, a plurality of light emitting modules, a light exiting layer and a plurality of backlight driving modules;

wherein the plurality of light emitting modules are disposed on a side of the base substrate and in different regions of the backlight module, wherein each of the plurality of light emitting modules comprises a first light emitting region, a second light emitting region and a third light emitting region;

wherein the light exiting layer is disposed on a side of the light emitting modules facing away from the base substrate, wherein the light exiting layer comprises a first light exiting region, a second light exiting region and a third light exiting region; wherein an overlapping region exists between a vertical projection of the first light emitting region on the base substrate and a vertical projection of the first light exiting region on the base substrate, an overlapping region exists between a vertical projection of the second light emitting region on the base substrate and a vertical projection of the second light exiting region on the base substrate, and an overlapping region exists between a vertical projection of the third light emitting region on the base substrate and a vertical projection of the third light exiting region on the base substrate;

wherein each of the plurality of backlight driving modules is connected to at least one of the plurality of light emitting modules, and the plurality of backlight driving modules is configured to drive the light emitting modules disposed in different regions of the backlight module to respectively control a light emitting intensity of the first light emitting region, a light emitting intensity of the second light emitting region and a light emitting intensity of the third light emitting region in each of the drove light emitting modules;

wherein the light exiting layer is a quantum dot layer; and the first light exiting region is a first quantum dot region, the second light exiting region is a second quantum dot region, and the third light exiting region is a third quantum dot region;

wherein the first quantum dot region, the second quantum dot region and the third quantum dot region have a same shape and a same size;

wherein the liquid crystal display panel is disposed on a side of the light exiting layer of the backlight module;

the liquid crystal display panel further comprises a display driving module, wherein the display driving module is configured to receive same image information as backlight driving modules; and wherein the quantum dot layer is provided as one of followings:
  wherein the quantum dot layer comprises a plurality of first quantum dot regions, a plurality of second quantum dot regions, and a plurality of third quantum dot regions arranged in an array; along a row direction, the first quantum dot regions, the second quantum dot regions, and the third quantum dot regions are alternately arranged; and along a column direction, the plurality of first quantum dot regions is arranged sequentially to form a first quantum dot region column, the plurality of second quantum dot regions is arranged sequentially to form a second quantum dot region column, and the plurality of third quantum dot regions is arranged sequentially to form a third quantum dot region column; or
  wherein the quantum dot layer comprises a plurality of first quantum dot regions, a plurality of second quantum dot regions, and a plurality of third quantum dot regions arranged in a matrix; the quantum dot layer comprises an odd-row quantum dot region and an even-row quantum dot region; the odd-row quantum dot region comprises the first quantum dot regions, the third quantum dot regions and the second quantum dot regions alternately arranged in sequence; the even-row quantum dot region comprises the second quantum dot regions, the first quantum dot regions and the third quantum dot regions alternately arranged in sequence; and along a row direction, the odd-row quantum dot region and the even-row quantum dot region adjacent to the odd-row quantum dot region are staggered by a preset distance; or
  wherein the quantum dot layer comprises a plurality of first quantum dot regions, a plurality of second quantum dot regions, and a plurality of third quantum dot regions arranged in a matrix; along a row direction, the second quantum dot regions, the third quantum dot regions and the first quantum dot regions are alternately arranged in sequence; and along a column direction, the second quantum dot regions, the first quantum dot regions and the third quantum dot regions are alternately arranged in sequence;
wherein the method for driving the display device comprises:
controlling the backlight driving modules and the display driving module to simultaneously acquire image information of a pre-displayed image, wherein the image information comprises brightness information and color information of the pre-displayed image;
controlling the backlight driving modules to control brightness of different regions of the backlight module according to the brightness information and adjust backlight colors of different regions of the backlight module according to the color information; and
controlling the display driving module to drive, according to the image information, the liquid crystal display panel to display an image.

11. A non-transitory electronic apparatus, comprising:
at least one processor; and
a memory, configured to store at least one program;
wherein the at least one program, when executed by the at least one processor, causes the at least one processor to implement a method for driving a display device;
wherein the display device comprises a backlight module and a liquid crystal display panel;
wherein the backlight module comprises a base substrate, a plurality of light emitting modules, a light exiting layer and a plurality of backlight driving modules;
wherein the plurality of light emitting modules are disposed on a side of the base substrate and in different regions of the backlight module, wherein each of the plurality of light emitting modules comprises a first light emitting region, a second light emitting region and a third light emitting region;
wherein the light exiting layer is disposed on a side of the light emitting modules facing away from the base substrate, wherein the light exiting layer comprises a first light exiting region, a second light exiting region and a third light exiting region; wherein an overlapping region exists between a vertical projection of the first light emitting region on the base substrate and a vertical projection of the first light exiting region on the base substrate, an overlapping region exists between a vertical projection of the second light emitting region on the base substrate and a vertical projection of the second light exiting region on the base substrate, and an overlapping region exists between a vertical projection of the third light emitting region on the base substrate and a vertical projection of the third light exiting region on the base substrate;
wherein each of the plurality of backlight driving modules is connected to at least one of the plurality of light emitting modules, and the plurality of backlight driving modules is configured to drive the light emitting modules disposed in different regions of the backlight module to respectively control a light emitting intensity of the first light emitting region, a light emitting intensity of the second light emitting region and a light emitting intensity of the third light emitting region in each of the drove light emitting modules;
wherein the light exiting layer is a quantum dot layer; and the first light exiting region is a first quantum dot region, the second light exiting region is a second quantum dot region, and the third light exiting region is a third quantum dot region;
wherein the first quantum dot region, the second quantum dot region and the third quantum dot region have a same shape and a same size;
wherein the liquid crystal display panel is disposed on a side of the light exiting layer of the backlight module;
the liquid crystal display panel further comprises a display driving module, wherein the display driving module is configured to receive same image information as backlight driving modules; and
wherein the quantum dot layer is provided as one of followings:
  wherein the quantum dot layer comprises a plurality of first quantum dot regions, a plurality of second quantum dot regions, and a plurality of third quantum dot regions arranged in an array; along a row direction, the first quantum dot regions, the second quantum dot regions, and the third quantum dot regions are alternately arranged; and along a column direction, the plurality of first quantum dot regions is arranged sequentially to form a first quantum dot region column, the plurality of second quantum dot regions is arranged sequentially to form a second quantum dot region column, and the plurality of third quantum dot regions is arranged sequentially to form a third quantum dot region column; or
  wherein the quantum dot layer comprises a plurality of first quantum dot regions, a plurality of second quantum dot regions, and a plurality of third quantum dot regions arranged in a matrix; the quantum dot layer comprises an odd-row quantum dot region and an even-row quantum dot region; the odd-row quantum dot region comprises the first quantum dot regions, the third quantum dot regions and the second quantum dot regions alternately arranged in sequence; the even-row quantum dot region comprises the second quantum dot regions, the first quantum dot regions and the third quantum dot regions alternately arranged in sequence; and along a row direction, the odd-row quantum dot region and the even-row quantum dot region adjacent to the odd-row quantum dot region are staggered by a preset distance; or wherein the quantum dot layer comprises a plurality of first quantum dot regions, a plurality of second quantum dot regions, and a plurality of third quantum dot regions arranged in a matrix; along a row direction, the second quantum dot regions, the third quantum dot regions and the first quantum dot regions are alternately arranged in sequence; and along a column direction, the second quantum dot regions, the first quantum dot regions and the third quantum dot regions are alternately arranged in sequence;

wherein the method for driving the display device comprises:

controlling the backlight driving modules and the display driving module to simultaneously acquire image information of a pre-displayed image, wherein the image information comprises brightness information and color information of the pre-displayed image;

controlling the backlight driving modules to control brightness of different regions of the backlight module according to the brightness information and adjust backlight colors of different regions of the backlight module according to the color information; and controlling the display driving module to drive, according to the image information, the liquid crystal display panel to display an image.

12. A non-transitory computer-readable storage medium, storing computer-executable instructions, wherein the computer-executable instructions are used for executing a method for driving a display device;

wherein the display device comprises a backlight module and a liquid crystal display panel;

wherein the backlight module comprises a base substrate, a plurality of light emitting modules, a light exiting layer and a plurality of backlight driving modules;

wherein the plurality of light emitting modules are disposed on a side of the base substrate and in different regions of the backlight module, wherein each of the plurality of light emitting modules comprises a first light emitting region, a second light emitting region and a third light emitting region;

wherein the light exiting layer is disposed on a side of the light emitting modules facing away from the base substrate, wherein the light exiting layer comprises a first light exiting region, a second light exiting region and a third light exiting region; wherein an overlapping region exists between a vertical projection of the first light emitting region on the base substrate and a vertical projection of the first light exiting region on the base substrate, an overlapping region exists between a vertical projection of the second light emitting region on the base substrate and a vertical projection of the second light exiting region on the base substrate, and an overlapping region exists between a vertical projection of the third light emitting region on the base substrate and a vertical projection of the third light exiting region on the base substrate;

wherein each of the plurality of backlight driving modules is connected to at least one of the plurality of light emitting modules, and the plurality of backlight driving modules is configured to drive the light emitting modules disposed in different regions of the backlight module to respectively control a light emitting intensity of the first light emitting region, a light emitting intensity of the second light emitting region and a light emitting intensity of the third light emitting region in each of the drove light emitting modules;

wherein the light exiting layer is a quantum dot layer; and the first light exiting region is a first quantum dot region, the second light exiting region is a second quantum dot region, and the third light exiting region is a third quantum dot region;

wherein the first quantum dot region, the second quantum dot region and the third quantum dot region have a same shape and a same size;

wherein the liquid crystal display panel is disposed on a side of the light exiting layer of the backlight module; the liquid crystal display panel further comprises a display driving module, wherein the display driving module is configured to receive same image information as backlight driving modules; and wherein the quantum dot layer is provided as one of followings:

wherein the quantum dot layer comprises a plurality of first quantum dot regions, a plurality of second quantum dot regions, and a plurality of third quantum dot regions arranged in an array; along a row direction, the first quantum dot regions, the second quantum dot regions, and the third quantum dot regions are alternately arranged; and along a column direction, the plurality of first quantum dot regions is arranged sequentially to form a first quantum dot region column, the plurality of second quantum dot regions is arranged sequentially to form a second quantum dot region column, and the plurality of third quantum dot regions is arranged sequentially to form a third quantum dot region column; or wherein the quantum dot layer comprises a plurality of first quantum dot regions, a plurality of second quantum dot regions, and a plurality of third quantum dot regions arranged in a matrix; the quantum dot layer comprises an odd-row quantum dot region and an even-row quantum dot region; the odd-row quantum dot region comprises the first quantum dot regions, the third quantum dot regions and the second quantum dot regions alternately arranged in sequence; the even-row quantum dot region comprises the second quantum dot regions, the first quantum dot regions and the third quantum dot regions alternately arranged in sequence; and along a row direction, the odd-row quantum dot region and the even-row quantum dot region adjacent to the odd-row quantum dot region are staggered by a preset distance; or wherein the quantum dot layer comprises a plurality of first quantum dot regions, a plurality of second quantum dot regions, and a plurality of third quantum dot regions arranged in a matrix; along a row direction, the second quantum dot regions, the third quantum dot regions and the first quantum dot regions are alternately arranged in sequence; and along a column direction, the second quantum dot regions, the first quantum dot regions and the third quantum dot regions are alternately arranged in sequence;

wherein the method for driving the display device comprises:

controlling the backlight driving modules and the display driving module to simultaneously acquire image information of a pre-displayed image, wherein the image information comprises brightness information and color information of the pre-displayed image;

controlling the backlight driving modules to control brightness of different regions of the backlight module according to the brightness information and adjust backlight colors of different regions of the backlight module according to the color information; and controlling the display driving module to drive, according to the image information, the liquid crystal display panel to display an image.

\* \* \* \* \*